US007271558B2

(12) United States Patent
Aspelmayr et al.

(10) Patent No.: US 7,271,558 B2
(45) Date of Patent: Sep. 18, 2007

(54) METHOD FOR THE GENERATION OF ELECTRICAL PULSES

(75) Inventors: Josef Aspelmayr, Ried/Riedmark (AT); Bernd Falke, Pentling (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/565,410

(22) PCT Filed: Jun. 16, 2004

(86) PCT No.: PCT/EP2004/051127

§ 371 (c)(1),
(2), (4) Date: Feb. 17, 2006

(87) PCT Pub. No.: WO2005/010336

PCT Pub. Date: Feb. 3, 2005

(65) Prior Publication Data

US 2006/0214615 A1 Sep. 28, 2006

(30) Foreign Application Priority Data

Jul. 22, 2003 (DE) ................................ 103 33 318

(51) Int. Cl.
*H02K 23/16* (2006.01)

(52) U.S. Cl. ...................... 318/437; 318/603; 318/570; 377/47; 123/406.47; 123/478

(58) Field of Classification Search ................ 318/138, 318/139, 567, 568.12, 437, 603, 570; 123/406.62, 123/406.47, 478, 90.15; 377/47
See application file for complete search history.

(56) References Cited

U.S. PATENT DOCUMENTS 3,686,956 A * 8/1972 Simpkin et al. .............. 73/462
4,082,069 A * 4/1978 Mayer ................... 123/406.63
4,086,471 A * 4/1978 Takahashi .................... 377/47
4,320,732 A * 3/1982 Schnurle et al. ............ 123/478
4,498,444 A * 2/1985 Tabuchi et al. ............. 123/478

(Continued)

FOREIGN PATENT DOCUMENTS

DE 37 86 741 T2 4/1988

(Continued)

OTHER PUBLICATIONS

Sheer: "Using the 80C196KB", Intel Corporation, AP-466, EMD Applications, XP-002296671, Nov. 30, 1991, Order No. 272116-001, pp. 1-41.

*Primary Examiner*—Paul Ip
(74) *Attorney, Agent, or Firm*—Laurence A. Greenberg; Werner H. Stemer; Ralph E. Locher

(57) ABSTRACT

In rotating systems with angular references, angular- and/or time-based pulses must be generated which can be described in a generic manner to meet various requirements. The parameters for definition of the pulse are assigned as a value pair to permit more flexibility on definition of a pulse for generation, one value of which defines the type of the parameter, in other words, whether an angle, a time, or some other parameter is being defined. A calculation device can correctly assign the size value of the parameter using the additional value, interpret and carry out suitable subroutines to calculate the control values for controlling the relevant pulse generation circuits.

7 Claims, 3 Drawing Sheets

U.S. PATENT DOCUMENTS

| | | | | |
|---|---|---|---|---|
| 4,501,249 | A * | 2/1985 | Amano et al. | 123/478 |
| 4,512,317 | A * | 4/1985 | Pauwels et al. | 123/478 |
| 4,630,206 | A * | 12/1986 | Amamo et al. | 701/110 |
| 5,077,488 | A | 12/1991 | Davis | |
| 5,279,272 | A * | 1/1994 | Kruger | 123/486 |
| 5,546,909 | A * | 8/1996 | Messih et al. | 123/492 |
| 5,697,960 | A | 12/1997 | Molin et al. | |
| 5,732,381 | A * | 3/1998 | Guido et al. | 701/104 |
| 6,246,192 | B1 | 6/2001 | Haass | |
| 6,553,965 | B2 | 4/2003 | Umemoto | |
| 6,681,741 | B2 * | 1/2004 | Majima et al. | 123/399 |
| 2002/0050272 | A1 * | 5/2002 | Yonezawa et al. | 123/406.62 |
| 2002/0066436 | A1 * | 6/2002 | Majima et al. | 123/406.47 |
| 2002/0189588 | A1 * | 12/2002 | Umemoto | 123/406.47 |
| 2003/0029414 | A1 | 2/2003 | Boss et al. | |
| 2004/0011311 | A1 * | 1/2004 | Takahashi | 123/90.15 |

FOREIGN PATENT DOCUMENTS

| | | | |
|---|---|---|---|
| DE | 694 28 342 | T2 | 7/1995 |
| DE | 197 22 453 | C1 | 10/1998 |
| DE | 101 59 795 | A1 | 1/2003 |
| EP | 0 264 691 | A2 | 4/1988 |
| WO | 02/08599 | A1 | 1/2002 |

* cited by examiner

METHOD FOR THE GENERATION OF ELECTRICAL PULSES

BACKGROUND OF THE INVENTION

FIELD OF THE INVENTION

The invention relates to a method for the generation of electrical pulses, in which input signals from a reference source are fed into calculation means, under program control using entered parameters the calculation means calculate control values dependent on the input signals for controlling a pulse generation circuit, and the pulse generation circuit generates a temporal sequence of electrical voltage levels at least one output as a function of the control values.

Problems occur with regard to generating electrical pulses in a large number of technical systems. The situation is known from motor vehicles, for example, where a rotating mechanical system, namely a component of the motor vehicle engine, serves as a reference source which uses cyclically repeated signals as a reference for the generation of electrical control pulses that are in turn used for controlling further electromechanical devices such as injection valves, injectors etc. In accordance with the terminology of the preamble of claim 1, three levels can be functionally differentiated in this situation. The actual electrical pulses are generated as a temporal sequence of different electrical voltage levels at the output of an actual pulse generation circuit. This can for example comprise an arrangement of transistors and other electronic components which are controlled in a suitable manner by the input of control values. The control values are the result of a calculation by calculation means, a microprocessor for example, which receive on the one hand reference signals as their input data from a cyclical reference source and on the other hand use certain computing rules and parameters in order to define the pulses to be generated, with the result that a conversion of this information into control values suitable for the special pulse generation circuit can take place. It should be noted that the division into three functional levels is only used for purposes of explanation within the scope of the present description, and that with regard to the concrete, technical implementation the calculation means and pulse generation circuit can for example be designed as a combined device however, as an interface card or similar for example.

In the case of generic devices according to the prior art, the pulses are always defined in a fixed manner, in other words by means of specified parameters, and the definitions of different pulses are differentiated solely in the sizes of the definition parameters. A pulse is thus frequently defined by its beginning and its duration, whereby the beginning is described as an angle and the duration as a time. Another known possible means of definition consists in describing the pulse by means of its end and its duration, whereby the end is described as an angle and the duration as a time. Finally, a method is known for describing a single pulse by its beginning and its end, whereby both parameters take the form of an angle. The type of definition specifically chosen depends on the control values which are required in order to control the pulse generation circuit.

This arrangement conceals a significant disadvantage. The definitions of different pulses generally originate from mathematical calculations representing physical events. If, for example, the physical events change during the operation of the overall system it may be the case that changed pulses need to be calculated and generated, whereby the mathematical description of the changed physical events would be provided most advantageously by means of an adapted pulse definition with adapted parameters. Instead, in the case of known systems it is merely possible to change the sizes of the defined parameters in such a way that a pulse definition must be used which does not result naturally from the mathematical modeling of the underlying physical events.

This results in more complex programming and longer calculation times.

SUMMARY OF THE INVENTION

An object of the present invention is to develop a generic method such that the aforementioned problems associated with the prior art are overcome, in particular to set down a method which enables greater flexibility in the definition of the pulses to be generated. This object is achieved in conjunction with the features of the preamble of claim 1 by the fact that the entered parameters in each case comprise a pair of values, of which one value represents a size for the entered parameter and another value represents a type for the entered parameter, and the processing of the size for the parameter in the calculation means takes place as a function of the type of the entered parameter.

According to the invention, the parameters for the definition of the pulses are entered as a pair of values, of which one value, as previously, represents the size for the parameter. An additional value specifies the type of the parameter, in other words whether it is for example an angle, a time or some other type of parameter. The calculation means are able to use the additional value to correctly categorize and interpret the size value for the parameter and to execute the suitable subroutines in order to calculate the control values for controlling the actual pulse generation circuit.

Provision is advantageously made whereby each pulse to be output by the pulse generation circuit is defined by means of two parameters. This is the number of parameters which is required and sufficient for defining a pulse. As mentioned previously, the calculation means are able to use the additional values for each individual parameter to correctly categorize the entered parameters. They are preferably also able to choose and execute the suitable routines for calculating the control values for the pulse generation circuit from the combination of the types of the parameter pair entered for defining a pulse.

The parameters used for defining a pulse can represent time and/or angle sizes. In this situation, a pulse can be defined for example by an angle size and a time size. It is thus possible for example to specify the position of the pulse on the basis of the angle of the beginning of the pulse relative to a reference angle and also the pulse duration as a time. It is similarly possible to specify the pulse position as the angle of the end of the pulse relative to a reference angle and the pulse duration as a (negative) time. The reference angle can be an absolute reference angle, for example a top dead center in an engine, serving as the reference source. On the other hand, a characteristic value for an adjacent pulse can also serve as the reference angle. With regard to a different approach, which can also result in a pulse definition by means of an angle size and a time size, it is not a position and a pulse duration but two positions, namely that of a falling edge and that of a rising edge, which are determined. Without restricting the universality, it is assumed in the following to be a case of negative pulses whose falling edge precedes the rising edge in time. The invention can naturally also be applied to positive pulses having a reversed sequence of falling and rising edges.

With regard to another preferred embodiment of the method according to the invention, provision is made whereby two angle sizes are used for the definition of a pulse. Provision can be made here for example to specify the position of the beginning of the pulse as an angle relative to a reference angle and the pulse duration as a difference angle. It is similarly possible to specify the position of the end of the pulse as an angle relative to a reference angle and the pulse duration as a (negative) difference angle. Instead of the position and pulse duration, with this embodiment it is also possible to describe a pulse by specifying its falling and rising edges which are then defined in each case as an angle relative to a reference angle. It also holds true here that the reference angle can be both an absolute reference angle and also an angle relating to an adjacent pulse.

Finally, as provided in the case of a further preferred embodiment of the method according to the invention, it is possible for two time sizes to be used for the definition of a pulse. In this case, it is possible for example to specify the position of the beginning of the pulse as a first time and the pulse duration as a second time. According to the second methodology, the two edges of a pulse can also each be specified by means of a time value. In this situation, the time specification can in each case be made relative to a temporally preceding point in time or relative to a temporally following point in time, which results in the specification of positive and negative times respectively. This makes it possible to define the pulses relative to absolute reference points in time, relative to adjacent preceding pulses or relative to adjacent following pulses.

As a result of the diversity of options provided according to the invention for the definition of the pulses to be generated the overall system can be implemented in a particularly flexible manner and the pulse definition can take place in each case in such manner as results most favorably from the mathematical modeling of the underlying physical problem or of the physical circumstances.

In a preferred embodiment of the method according to the invention, provision is made whereby the definition of a pulse is different during different cycles of the method. As mentioned previously, a change in the pulse definition is then frequently required when physical circumstances affecting the overall system change. The changes are often of a type which necessitates changed modeling of the physical circumstances. This can in turn make it appear advantageous to change the manner of definition for the pulses to be generated. The present invention makes it possible to always use the optimized manner of definition instead, as in the prior art, of having to keep to a fixed manner of definition and merely being able to change the parameter sizes.

The system referred to above as "overall system" will often be an electromechanical system whose current physical conditions, dependent for example on a special operating state, predetermine the optimum manner of definition for the parameters. In this situation, in particular the reference source will particularly frequently comprise a rotating mechanical system such as rotating components of the engine of a motor vehicle, for example.

It should be noted that, although within the scope of this description reference is always made to individual pulses and their definition, it is not imperative for the present invention that each individual pulse generated is calculated individually by the computing unit on the basis of separate input values. It is naturally also possible to perform the re-calculation simply in the event of definition or size changes.

Further details of the present invention will emerge from the detailed description which follows with reference to the drawings. In the drawings:

DESRIPTION OF THE PREFERRED EMBODIEMENTS

Figure 1:
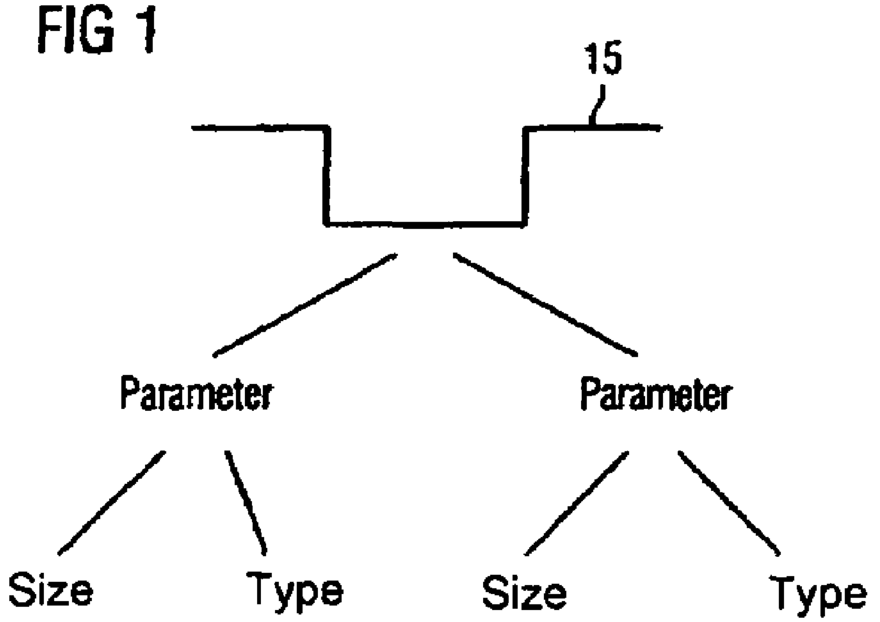
FIG. 1 shows a tree diagram providing an explanation of the pulse definition according to the invention.

FIG. 1 schematically illustrates the structure of a pulse definition according to the invention. Each pulse 15 is preferably defined by means of two parameters which for their part are each entered as a pair of values into the calculation means. Each pair of values comprises a value for the actual parameter size and an additional value for determining the parameter type (for example angle, time etc.). It should be noted that the term input should be understood in a broad sense within the scope of this description and includes the incorporation of values from any suitable type of interfaces (for example software interface, hardware interface, own calculation etc.).

Figure 2:
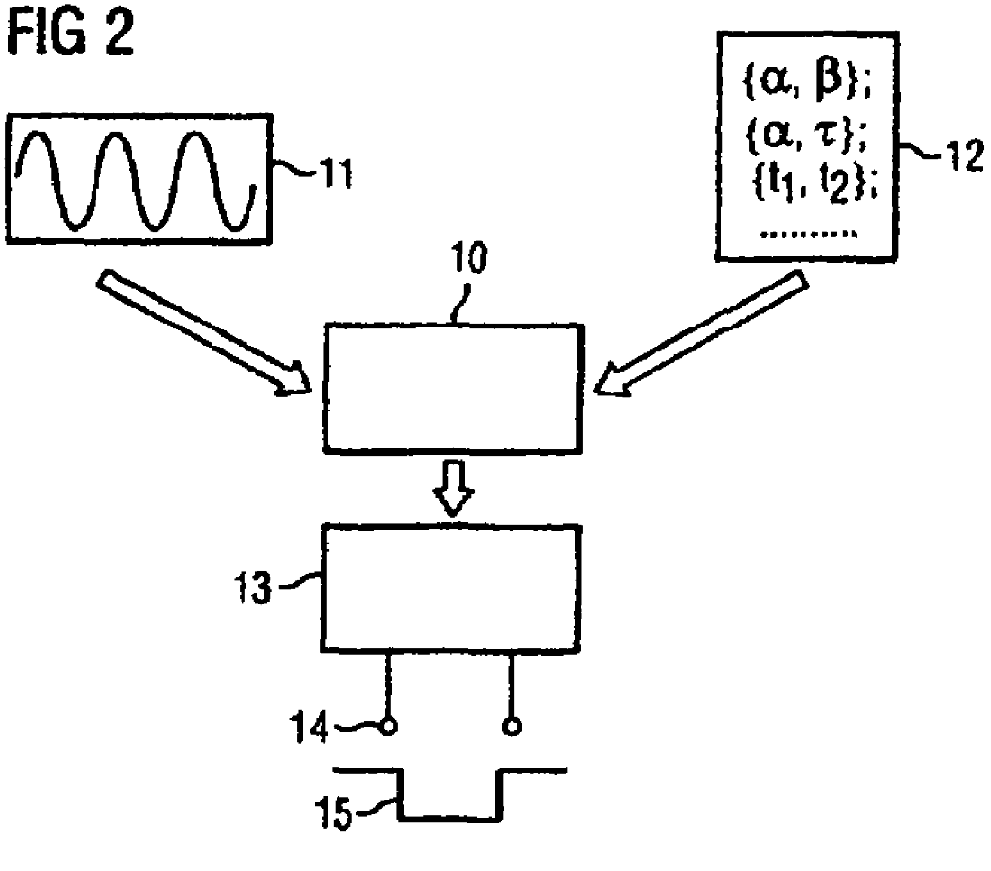
FIG. 2 shows a functional block diagram illustrating the method according to the invention.

FIG. 2 shows a functional block diagram of the method according to the invention. A calculation means block 10 receives input values from a reference source 11 on the one hand. Any harmonically oscillating system is suitable for this purpose, rotating systems in particular, such as the engine of a motor vehicle for example, whereby merely characteristic values, denoting the respective top dead centers for example, need to be transferred to the calculation means 10. On the other hand, the calculation means 10 receive pulse definitions constructed by a parameter source 12 in accordance with FIG. 1. Different combinations of angles ($\alpha$, $\beta$) and/or time values ($\tau$, $t_1$, $t_2$) symbolize possible parameter combinations by way of example.

Using the reference values from the reference source 11, the calculation means calculate from the pulse definitions control values which are used for controlling the actual pulse generation circuit 13. In response to the input of the control values the pulse generation circuit 13 makes available at its outputs 14 a sequence of different electrical voltage levels which represent the desired pulse sequence 15. As mentioned previously, the functional division as illustrated in FIG. 2 is undertaken only in order to provide a better explanation of the present invention. Systems actually implemented can collectively incorporate a plurality of the units shown or in a different grouping.

FIG. 3 illustrates four possible options for pulse definition by means of pulse position and pulse duration, whereby at least one angle parameter is used in each case. FIG. 3*a* shows the pulse definition given by specifying the position of the beginning of the pulse as angle $\alpha$ relative to a reference angle and the pulse duration given by specifying a difference angle $\beta$ relative to the position angle $\alpha$.

Figure 3A:
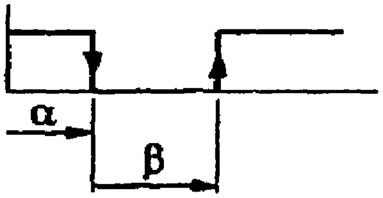
FIG. 3 shows four examples of a possible pulse definition.
Figure 3B:
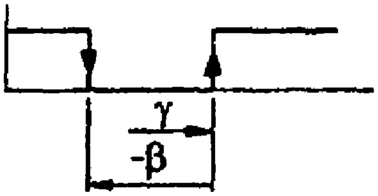

FIG. 3*b* shows a pulse definition given by specifying the end of the pulse as angle $\gamma$ relative to a reference angle and by specifying the pulse duration as a negative difference angle $-\beta$ relative to the position angle $\gamma$.

Figure 3C:
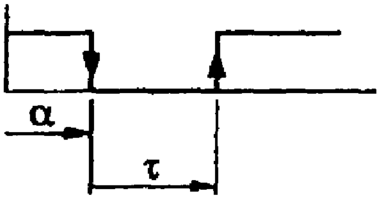

Like FIG. 3a, FIG. 3c shows a pulse definition given by specifying the beginning of the pulse as angle $\alpha$ relative to a reference angle. In this case, however, the pulse duration is specified as a time $\tau$.

Figure 3D:
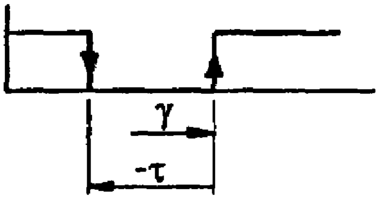

Like FIG. 3b, FIG. 3d shows a pulse definition given by specifying the end of the pulse as angle $\gamma$ relative to a reference angle. In this case, however, the pulse duration is specified as a negative time $-\tau$.

FIG. 4 shows possible options for pulse definition of pulse n by using two time parameters. In this situation, FIG. 4a shows the pulse definition given by specifying the beginning of the pulse as time $\tau_1$ relative to a reference time, in particular to the end of a preceding pulse n−1. The pulse duration is specified as time $\tau_2$.

Figure 4A:
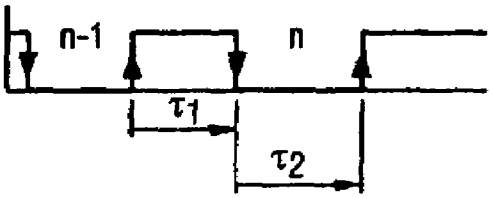
FIG. 4 shows four further examples of a possible pulse definition.
Figure 4B:
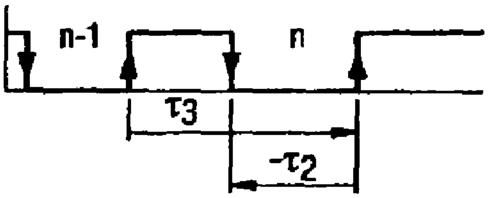

FIG. 4b shows a pulse definition given by specifying the end of the pulse as time $\tau_3$ relative to a reference point in time, in particular to the end of the preceding pulse n−1.

The pulse duration is specified here as a negative time $-\tau_2$.

Figure 4C:
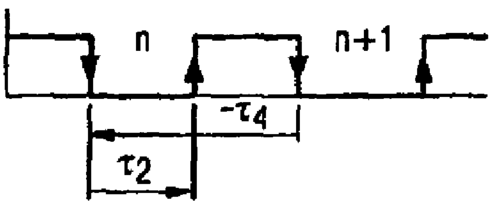

FIG. 4c shows a pulse definition given by specifying the beginning of the pulse as a negative time $-\tau_4$ relative to a temporally following reference point in time, here in particular relative to the beginning of the following pulse n+1. The pulse duration is specified as time $\tau_2$.

Figure 4D:
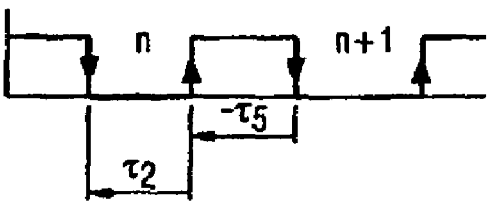

FIG. 4d shows a pulse definition given by specifying the end of the pulse as a negative time $-\tau_5$ relative to a temporally following reference point in time, here in particular relative to the beginning of the following pulse n+1. The pulse duration is specified here as a negative time $-\tau_2$.

FIG. 5 shows examples of pulse definition in which it is not the pulse position and pulse duration that are specified but the locations of the falling edge and the rising edge. With regard to the negative pulses shown in this example, the falling edge precedes the rising edge in time. The person skilled in the art will however experience no difficulties in transferring to positive pulses, in which situation the rising edge precedes the falling edge in time. FIG. 5a shows a pulse definition whereby the falling and rising edges are each defined as angles $\alpha$ and $\beta$ respectively relative to a reference angle.

Figure 5A:
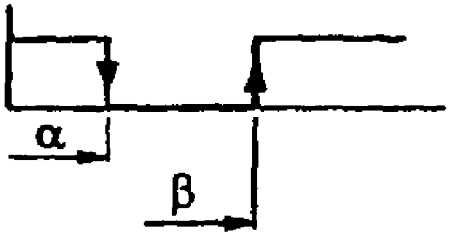
FIGS. 5A-5D shows four further examples of a possible pulse definition.
Figure 5B:
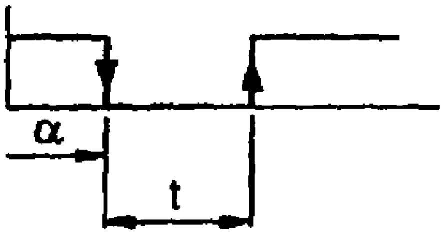

In the example shown in FIG. 5b the location of the falling edge is likewise defined as angle $\alpha$ relative to a reference angle, whereas the location of the rising edge is described as a time t relative to the falling edge.

Figure 5C:
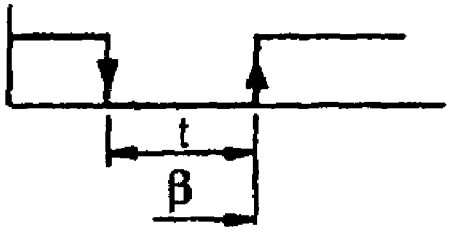

FIG. 5c shows the determination of the rising edge as angle $\beta$ relative to a reference angle and the determination of the falling edge as time specification t relative to the rising edge.

Figure 5D:
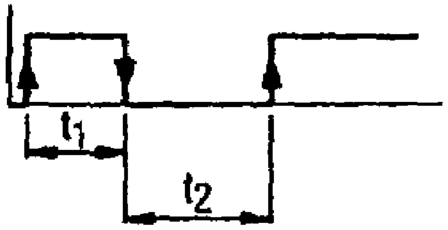

FIG. 5d finally shows the determination of the falling edge as time specification $t_1$ relative to a temporally preceding event, here in particular relative to the rising edge of the temporally preceding pulse. The rising edge is described in this example as time specification $t_2$ relative to the falling edge.

Figure 6:
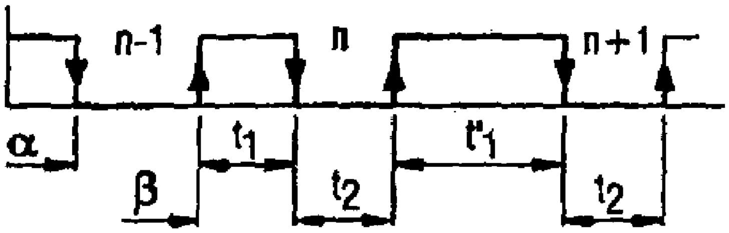
FIG. 6 shows an example of the definition of a pulse sequence.

FIG. 6 finally shows an example of a pulse sequence in which the individual pulses are defined in different ways. Pulse n−1 is defined by the specification of an angle $\alpha$ for its falling edge and also by a further angle $\beta$ for its rising edge. In this situation, both angles $\alpha$, $\beta$ refer to a reference value which is not shown. The pulse n−1 corresponds to an example according to FIG. 5a. The following pulse n is defined by a time specification $t_1$ for its falling edge, whereby this time specification is determined relative to the rising edge of the preceding pulse n−1. The rising edge of pulse n is defined as time $t_2$ relative to the falling edge of pulse n. This corresponds to a pulse definition according to FIG. 5d. Finally, the temporally following pulse n+1 is defined in the same way as pulse n, whereby however the size for the time parameter $t'_1$ changes for determining the falling edge whereas the size for the time parameter $t_2$ remains unchanged for determining the rising edge.

The embodiments of the present invention described and shown in the figures naturally simply represent particularly favorable and advantageous exemplary embodiments which serve simply to illustrate the invention and are not intended to restrict its scope in any way. In particular, instead of or in addition to the aforementioned angle and time specifications it is possible to use other physical or mathematical sizes in order to define the pulses.

The features of the invention disclosed in the above description, in the drawings and also in the claims can be important both individually and also in any desired combination for the realization of the invention.

We claim:

1. A method of generating electrical pulses, which comprises:

providing a reference source, program-controlled calculation means connected to receive input signals from the reference source, and a pulse generation circuit connected to receive control values from the calculation means;

feeding input signals from the reference source into the calculation means;

calculating, with the calculation means and with entered parameters, control values dependent on the input signals for controlling the pulse generation circuit;

generating, at an output of the pulse generation circuit, a temporal sequence of electrical voltage levels in dependence on the control values;

wherein the entered parameters in each case comprise a value pair with a first value representing a size of the entered parameter and a second value representing a type of the entered parameter, and the size for the parameter in the calculation means is processed as a function of the type of the entered parameter, and the parameters defining a pulse represent time values and/or angular values; and wherein the definition of a pulse is different during different processing cycles.

2. The method according to claim 1, which comprises defining each pulse to be output by the pulse generation circuit by way of two parameters.

3. The method according to claim 1, which comprises defining a pulse by an angular value and a time value.

4. The method according to claim 1, which comprises defining a pulse by two angular values.

5. The method according to claim 1, which comprises defining a pulse by two time values.

6. The method according to claim 1, which comprises calculating the entered parameters as a function of physical conditions of an electromechanical system.

7. The method according to claim 1, wherein the reference source comprises a rotating mechanical system.

* * * * *